United States Patent
Zhu et al.

(10) Patent No.: US 8,075,869 B2
(45) Date of Patent: *Dec. 13, 2011

(54) METHOD AND SYSTEM FOR PRODUCING A HYDROGEN ENRICHED FUEL USING MICROWAVE ASSISTED METHANE DECOMPOSITION ON CATALYST

(75) Inventors: Zhonghua John Zhu, Brisbane (AU); Jiuling Chen, Brisbane (AU); Gaoqing Max Lu, Brisbane (AU); Gregory Solomon, Cottesloe (AU)

(73) Assignee: Eden Energy Ltd., Perth (AU)

( * ) Notice: Subject to any disclaimer, the term of this patent is extended or adjusted under 35 U.S.C. 154(b) by 529 days.

This patent is subject to a terminal disclaimer.

(21) Appl. No.: 11/657,212

(22) Filed: Jan. 24, 2007

(65) Prior Publication Data
US 2008/0173532 A1    Jul. 24, 2008

(51) Int. Cl.
*C01B 3/26* (2006.01)
(52) U.S. Cl. .................................. 423/650; 423/651
(58) Field of Classification Search ............... 423/650
See application file for complete search history.

(56) References Cited

U.S. PATENT DOCUMENTS

| | | | |
|---|---|---|---|
| 4,435,376 A * | 3/1984 | Porter et al. | 423/447.3 |
| 4,574,038 A | 3/1986 | Wan | |
| 5,015,349 A | 5/1991 | Suib | |
| 5,131,993 A | 7/1992 | Suib | |
| 5,139,002 A | 8/1992 | Lynch et al. | |
| 5,205,912 A | 4/1993 | Murphy | |
| 5,205,915 A | 4/1993 | Ravella et al. | |
| 5,266,175 A | 11/1993 | Murphy | |
| 5,277,771 A | 1/1994 | Murphy | |
| 5,277,773 A | 1/1994 | Murphy | |
| 5,366,712 A | 11/1994 | Violante et al. | |
| 5,372,617 A * | 12/1994 | Kerrebrock et al. | 48/61 |
| 5,516,967 A | 5/1996 | Pandey et al. | |
| 5,525,322 A | 6/1996 | Willms | |
| 5,972,175 A | 10/1999 | Tanner et al. | |
| 6,165,438 A * | 12/2000 | Willms et al. | 423/652 |
| 6,509,000 B1 | 1/2003 | Choudhary et al. | |
| 6,592,723 B2 | 7/2003 | Cha | |

(Continued)

FOREIGN PATENT DOCUMENTS

AU    51876/99 A    2/2000

(Continued)

OTHER PUBLICATIONS

M. Momirlan & T. Veziroglu, "Recent directions of world hydrogen production", Renewable & Sustainable Energy Reviews, 1999, pp. 219-231, Elsevier Science Ltd.

(Continued)

*Primary Examiner* — Melvin Mayes
*Assistant Examiner* — Kenneth Vaden
(74) *Attorney, Agent, or Firm* — Stephen A. Gratton

(57) ABSTRACT

A method for producing a hydrogen enriched fuel includes the steps of providing a flow of methane gas, and providing a catalyst. The method also includes the steps of heating the catalyst instead of the reactor walls and the methane gas using microwave irradiation at a selected microwave power, directing the flow of methane gas over the catalyst, and controlling the microwave power to produce a product gas having a selected composition. A system for producing a hydrogen enriched fuel includes a methane gas source, a reactor containing a catalyst, and a microwave power source configured to heat the catalyst.

23 Claims, 4 Drawing Sheets

U.S. PATENT DOCUMENTS

| | | | |
|---|---|---|---|
| 6,759,025 B2 * | 7/2004 | Hong et al. | ............... 423/447.3 |
| 6,783,632 B2 | 8/2004 | Cha | |
| 6,875,417 B1 | 4/2005 | Shah et al. | |
| 6,994,907 B2 | 2/2006 | Resasco et al. | |
| 6,998,103 B1 | 2/2006 | Phillips et al. | |
| 7,001,586 B2 | 2/2006 | Wang et al. | |
| 7,011,768 B2 | 3/2006 | Jensen et al. | |
| 7,094,386 B2 | 8/2006 | Resasco et al. | |
| 7,094,679 B1 | 8/2006 | Li et al. | |
| 7,119,240 B2 | 10/2006 | Hall et al. | |
| 7,625,544 B2 | 12/2009 | Liu et al. | |
| 2002/0103405 A1 | 8/2002 | Hatanaka | |
| 2002/0146366 A1 | 10/2002 | Cha | |
| 2003/0129122 A1 | 7/2003 | Chen | |
| 2003/0206855 A1 | 11/2003 | Cha | |
| 2004/0265223 A1 | 12/2004 | Etievant et al. | |
| 2005/0063900 A1 * | 3/2005 | Wang et al. | ............... 423/658.2 |
| 2005/0065391 A1 | 3/2005 | Gattis et al. | |
| 2005/0288541 A1 | 12/2005 | Sherwood | |
| 2006/0021510 A1 * | 2/2006 | Henley et al. | ................... 96/143 |
| 2006/0037432 A1 | 2/2006 | Deevi et al. | |
| 2006/0163054 A1 | 7/2006 | Spitzl et al. | |
| 2006/0269669 A1 | 11/2006 | Jiang et al. | |
| 2007/0031299 A1 | 2/2007 | Jiang et al. | |
| 2007/0266825 A1 | 11/2007 | Ripley et al. | |
| 2008/0156630 A1 | 7/2008 | Lee et al. | |
| 2008/0159944 A1 | 7/2008 | Park | |
| 2008/0181845 A1 | 7/2008 | Zhu | |
| 2008/0210908 A1 | 9/2008 | Zhu | |
| 2009/0205254 A1 | 8/2009 | Zhu et al. | |

FOREIGN PATENT DOCUMENTS

| | | | |
|---|---|---|---|
| CA | 2031959 A1 | | 6/1991 |
| CA | 2084196 A1 | | 1/1992 |
| CA | 2103211 A1 | | 5/1994 |
| CA | 2103330 A1 | | 5/1994 |
| CA | 2338494 | | 2/2000 |
| CA | 2453841 A1 | | 1/2003 |
| EP | 1423331 A | | 2/1976 |
| EP | 0435591 A3 | | 7/1991 |
| EP | 0600738 A1 | | 6/1994 |
| EP | 0601797 A1 | | 6/1994 |
| EP | 1881944 A1 | | 1/2008 |
| FR | 2827591 A1 | | 1/2003 |
| JP | 6219970 A | | 9/1994 |
| JP | 2004-324004 A | | 11/2004 |
| JP | 2004324004 A | * | 11/2004 |
| JP | 2007000774 A | | 1/2007 |
| KR | 2006011876 | | 11/2006 |
| MX | 9307285 A1 | | 7/1994 |
| MX | 9307330 A1 | | 7/1994 |
| WO | 9202448 | | 2/1992 |
| WO | 0005167 | | 2/2000 |
| WO | 03008328 A1 | | 1/2003 |
| WO | WO 2006/107144 A1 | | 10/2006 |
| WO | 2006123883 A1 | | 11/2006 |
| WO | WO2008/090466 A2 | | 7/2008 |
| WO | WO2008/090467 A2 | | 7/2008 |
| WO | WO 2009/145936 A2 | | 3/2009 |
| WO | WO 2009103017 A1 | | 8/2009 |

OTHER PUBLICATIONS

John N. Armor, "The multiple roles for catalysis in the Production of H2", Applied Catalysis, 1999, pp. 159-175, Elsevier Science B.V.

Menderes Levent et al., "Production of hydrogen-rich gases from steam reforming of methane in an automatic catalytic microreactor", 1999, pp. 945-959, Elsevier Science Ltd.

Rong-Fang Horng et al., "Investigation of the production of hydrogen rich gas in a plasma converter for motorcycle applications", 2006, pp. 2155-2166, Elsevier Ltd.

Annika T. Nielsen et al., "Hydrogen production from organic waste", International Journal of Hydrogen Energy, 2001, pp. 547-550, Elsevier Science Ltd.

O. Khaselev et al. "High-efficiency integrated multijunction photovoltaic/electrolysis systems for hydrogen production", Int Jour of Hydro. Energy, 2001, pp. 127-132, Elsevier.

Chanjuan Xing et al. Band structure-controlled solid solution of Cd1-xZnS photocatalyst for hydrogen production by water splitting, Int Jour of Hydro. Energy, 2006, pp. 2018.

T. V. Choudhary et al., "Hydrogen Production via Catalytic Decomposition of Methane", Journal of Catalysis, 2001, pp. 9-18, Academic Press.

Nazim Muradov, "Hydrogen via methane decomposition: an application for decarbonization of fossil fuels", Inter. Jour of Hydrogen Energy, 2001,p. 1165-1175, Elsevier Science Ltd.

Naresh Shah et al., "Hydrogen Production by Catalytic Decomposition of Methane", Energy & Fuels, 2001, pp. 1528-1534, Amer. Chem. Society.

Pamela L. Spath et al., "Life Cycle Assessment of Hydrogen Production via Natural Gas Steam Reforming", Technical Report, NREL, Golden, CO, 2001, pp. 1-33.

Dr. Joan M. Ogden, "Review of Small Stationary Reformers for Hydrogen Production", Report for the International Energy Agency Agreement, 2001, pp. 1-52, Princeton Univ., NJ.

M. A. Rosen, "Thermodynamic Comparison of Hydrogen Production Processes", Int. J. Hydrogen Energy vol. 21, No. 5, 1996, pp. 349-465, Elsevier Science Ltd.

M. G. Poirier et al., "Catalytic Decomposition of Natural Gas to Hydrogen For Fuel Cell Applications", Int. J. Hydrogen Energy, vol. 22, No. 4, 1997, pp. 429-433, Elsevier Sci.

M.A. Ermakova et al., "Ni/SiO2 and Fe/SiO2 catalysts for production of hydrogen & filamentous carbon via methane decomposition", Catalysis Today 77, 2002, p. 225-235, Elsevier.

Sakae Takenaka, "Methane Decomposition into Hydrogen and Carbon Nanofibers over Supported PD-Ni catalysts", J. Phys. Chem B, 2004, p. 7656-7664, Amer. Chem. Society.

Tatsumi Ishihara et al., "CH4 Decomposition with a Pd-Ag Hydrogen-Permeating Membrane Reactor for Hydrogen Production at Decreased Temp." Ind. Eng. Chem Res. 2002, p. 3365-69.

Heiko Will et al., "Microwave-Assisted Heterogeneous Gas-Phase Catalysis", Chem. Eng. Technology, 2004, p. 113-122, Wiley-VCH.

Hiroshi Nagazoe et al., "Characteristics of Methane Conversion under Combined Reactions of Solid Catalyst with Microwave Plasma", J. Chem Eng. of JP, vol. 39, 2006, p. 314-320.

Jian Huang et al., "Activation of methane in microwave plasmas at high pressure", Res. Chem. Intermed, vol. 27 No. 6, 2001, p. 643-658.

Wonihl Cho et al., "Plasma catalytic reaction of natural gas to C2 product over Pd-NiO/Al2O3 and Pt-Sn/Al2O3 catalysts", Res. Chem. Intermed, vol. 28 No. 4, 2002, p. 343-357.

Carolina Marun et al., "Catalytic Oligomerization of Methane via Microwave Heating", J. Phys. Chem A, 1999, pp. 4332-4340, Amer. Chem. Soc.

Jianhua Tong et al., "Pure hydrogen production by methane steam reforming with hydrogen-permeable membrane reactor", Catalysis Today, 2006, pp. 147-152, Elsevier.

Xunli Zhang et al., "Apparent equilibrium shifts and hot-spot formation for catalytic reaction inducted by microwave dielectric heating", Chem. Commun., 1999, pp. 975-976.

Kui Zhang et al., "Conversion of Greenhouse Gases to Synthesis Gas and Higher Hydrocarbons", Energy & Fuels 2001, 15, 2001 American Chemical Society, pp. 395-402.

Kui Zhang et al. Direct Conversion of Greenhouse Gases to synthesis Gas and $C_4$ Hydrocarbons over Zeolite HY Promoted by a Dielectric-Barrier Discharge, Ind. Eng. Chem. Res. 2002, 41, 2002 American Chemical Society, pp. 1462-1468.

Wonihl Cho et al., "Conversion of natural gas to hydrogen and carbon black by plasma and application of plasma carbon black", Catalysis Today 98 (2004) no month, Elsevier, pp. 633-638.

David O. Conney and Zhenpeng XI, "Production of Hydrogen From Methane/Steam in a Microwave irradiated Char-Loaded Reactor", Fuel Science & Technology Int'l, 14(8), pp. 1111-1141, (1996) no month.

J. R. Thomas Jr., Particle size effect in microwave-enhanced catalysis, Catalysis Letter 49, J. C. Balltzer AG, Science Publishers, Oct. 19, 2007, pp. 137-141.

PCT International Application No. PCT/IB2008/000538 Search Report and Written Opinion dated Aug. 29, 2008, pp. 1-9.

PCT International Application No. PCT/IB2008/000508 Search Report and Written Opinion dated Aug. 26, 2008, pp. 1-14.
U.S. Appl. No. 12/030,970, filed Feb. 14, 2008.
Search Report prepared by CPA Global, Jul. 23, 2009, p. 1-13.
FTO Report prepared by PMG Associates, Aug. 6, 2009, pp. 1-6.
PCT Search Report and Written Opinion from International application No. PCT/US 09/34142 dated Jul. 10, 2009, pp. 1-7.
Office Action from U.S. Appl. No. 12/040,883 dated Oct. 29, 2009, pp. 1-19.
Office Action from U.S. Appl. No. 12/040,883 dated Apr. 6, 2010, pp. 1-20.
International application No. PCT/US2009/034142, Preliminary Report on Patentability dated Aug. 25, 2010, pp. 1-6.
Office Action from U.S. Appl. No. 11/657,299 dated Oct. 26, 2010, pp. 1-19.
Office Action from U.S. Appl. No. 11/657,299 dated Mar. 28, 2011, pp. 1-24.
Amendment filed on May 25, 2011 in response to the Office Action dated Mar. 28, 2011 in U.S. Appl. No. 11/657,299, pp. 1-16.
Notice of Allowance from U.S. Appl. No. 11/657,299 dated Jul. 21, 2011, pp. 1-10.
Office Action from U.S. Appl. No. 12/040,883 dated May 10, 2011, pp. 1-14.
Office Action from U.S. Appl. No. 12/030,970 dated Jul. 5, 2011, pp. 1-11.
Examiner's first report on Australia Patent Application Serial No. 2008208614 dated Feb. 25, 2011, pp. 1-2.
Examination Report on New Zealand Patent Application Serial No. 579553 dated Feb. 3, 2011, pp. 1-2.
First Office Action from the State Intellectual Property Office of the PRC in Patent Application No. 200880006502 (English translation), pp. 1-11.
Russian Patent Application Serial No. 2009128365/05, translation of Office Action (associate's short comments), Nov. 21, 2010, pp. 1-2.
Russian Patent Application Serial No. 2009128365/05, translation of Official Grant Notification issued by the Russian Patent Office on Jan. 13, 2011, p. 1.
New Zealand Patent Application Serial No. 578553, Examination Report dated Sep. 17, 2010, p. 1.
Russian Patent Application Serial No. 2009 128364/05, translation of Office Action (associate's short comments), Nov. 11, 2010, pp. 1-2.
New Zealand Patent Application Serial No. 578552, Examination Report dated Sep. 17, 2010, pp. 1.

* cited by examiner

METHOD AND SYSTEM FOR PRODUCING A HYDROGEN ENRICHED FUEL USING MICROWAVE ASSISTED METHANE DECOMPOSITION ON CATALYST

CROSS REFERENCE TO RELATED APPLICATIONS

This application is related to Ser. No. 11/657,299, filed Jan. 25, 2007, Publication No. US-2008-0181845-A1; to Ser. No. 12/030,970, filed Feb. 14, 2008, Publication No. US-2009-0205254-A1; and to Ser. no. 12/040,883, filed Mar. 01, 2008, Publication No. US-2008-0210908-A1.

FIELD OF THE INVENTION

This invention relates generally to the production of hydrogen fuels, and particularly to a method and a system for producing a hydrogen enriched fuel suitable for use as an alternative fuel.

BACKGROUND OF THE INVENTION

Gaseous alternative fuels, such as hydrogen and natural gas, are valued for their clean burning characteristics in motor vehicle engines. Various processes have been developed for producing hydrogen. These processes include electrolysis, exotic water splitting, and separation from industrial waste streams.

Hydrogen can also be produced by reforming natural gas. Typically, a multi-step process is used to convert a hydrocarbon fuel, such as methane, propane or natural gas, into a high purity hydrogen gas stream. The steps of the process typically include (1) synthesis gas generation, (2) water-gas shift reaction, and (3) gas purification (e.g., CO and $CO_2$ removal). The hydrogen gas stream can then be used for a variety of purposes including mixture with other gases to produce an alternative fuel.

For example, a particularly clean burning gaseous alternative fuel known as HYTHANE comprises a mixture of hydrogen and natural gas. The prefix "Hy" in HYTHANE is taken from hydrogen. The suffix "thane" in HYTHANE is taken from methane, which is the primary constituent of natural gas. HYTHANE is a registered trademark of Brehon Energy PLC. HYTHANE typically contains about 5% to 7% hydrogen by energy, which corresponds to 15% to 20% hydrogen by volume.

For producing hydrogen, one type of reformer called a "steam reformer" uses a hydrocarbon fuel and steam ($H_2O$). In the steam reformer, the hydrocarbon fuel is reacted in a heated reaction tube containing steam ($H_2O$) and one or more catalysts. In general, the production of a high purity hydrogen gas by reforming requires high temperatures (800-900° C.). Steam reforming also produces impurities, particularly CO and $CO_2$, which if not removed, are ultimately released to the atmosphere.

The production of a high purity hydrogen gas by reforming also requires large capital costs for the equipment, and large operating costs, particularly for power. In addition to these shortcomings, it is difficult to manufacture a compact embodiment of a steam reformer. It would be advantageous for a hydrogen production system to have a relatively compact size, such that alternative fuels could be produced at a facility the size of a gas station, rather than at a facility the size of a refinery.

Another process for producing hydrogen from natural gas involves the thermal decomposition of methane. For example, methane decomposes into hydrogen by the reaction:

$$CH_4 = C + 2H_2$$

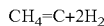

For example, the thermal decomposition of natural gas has been used in the "Thermal Black Process" for producing carbon black and hydrogen. Using thermal decomposition, the energy requirements per mole of hydrogen produced (37.8 kJ/mol $H_2$) is considerably less than the energy requirements of the steam reforming process (63.3 kJ/mol $H_2$). However, the process still requires high temperatures (e.g., 1400° C.), high equipment costs, and high energy expenditures.

Recently, thermal decomposition of natural gas has been investigated in combination with various catalysts, which allow the reaction to proceed at lower temperatures. For example, U.S. Pat. No. 7,001,586 B2, to Wang et al. discloses a thermal decomposition process in which two catalysts having the formula $Ni_xMg_yO$ and $Ni_xMg_yCu_zO$, respectively, are used to decompose methane to carbon and hydrogen. The former needs a lower temperature from about 425° C. to 625° C., but the lifetime is shorter and the activity is lower. The latter's lifetime is longer and the activity is higher, but the required reaction temperature is much higher, from about 600° C. to 775° C. More importantly, however, these processes require high energy expenditures to heat the wall of the reactor, the gas and the catalysts.

It would be advantageous for a hydrogen production system to be capable of performance at lower temperatures and lower energy expenditures, with a variety of catalysts active for long periods, and with minimal carbon emissions (e.g., CO, $CO_2$). In addition, it would be advantageous for a hydrogen production system to have a size and configuration adaptable to the production of alternative fuels containing hydrogen. The present disclosure is directed to a method and a system for producing a hydrogen enriched fuel that overcomes many of the shortcomings of prior art hydrogen production systems.

The foregoing examples of the related art and limitations related therewith are intended to be illustrative and not exclusive. Other limitations of the related art will become apparent to those of skill in the art upon a reading of the specification and a study of the drawings. Similarly, the following embodiments and aspects thereof are described and illustrated in conjunction with a system and method, which are meant to be exemplary and illustrative, not limiting in scope.

SUMMARY OF THE INVENTION

A method for producing a hydrogen enriched fuel includes the steps of providing a flow of methane gas, providing a catalyst, selectively heating the catalyst instead of the reactor walls and the methane gas using microwave irradiation at a selected microwave power, directing the flow of methane gas over the catalyst, and controlling the microwave power to produce a product gas having a selected composition.

The method can be performed in a reactor having a reaction chamber with microwave transparent walls. In addition, the catalyst can comprise a metal, such as a Ni-based compound prepared by coprecipitation. On the surface of the catalyst reactions occur in which methane ($CH_4$) dissociates into hydrogen ($H_2$) and solid carbon (C) in the form of fibrous carbon. In addition, some of the methane gas fails to react (methane slip) such that the product gas comprises methane and hydrogen. The catalyst is selected and formulated to remain stable under operating conditions (e.g., gas flow rate, microwave power, catalyst amount), such that costs are minimized. In addition, the catalyst maintains active characteristics through many hours of reactions.

The flow of methane gas and the microwave power can be controlled such that the composition of the product gas approximates the chemical composition of HYTHANE. For example, the product gas can comprise from about 20% to 30% hydrogen by volume, and from about 70% to 80% methane by volume. Advantageously, the product gas contains almost no carbon impurities (e.g., CO, $CO_2$), as carbon is converted to solid fibrous carbon which drops out of the product gas as a useful by-product. In addition, the product gas contains only negligible amounts of higher order hydrocarbons (e.g., $C_2H_4$, $C_2H_2$, $C_3H_6$, $C_3H_8$, $C_3H_4$).

A system for producing a hydrogen enriched fuel includes a methane gas source configured to provide a methane gas flow. The system also includes a reactor having a reaction chamber in flow communication with the methane gas source configured to contain a catalyst, and to circulate the methane gas in contact with the catalyst. The system also includes a microwave power source configured to heat the catalyst in the reaction chamber to form a product gas having a selected volumetric percentage of hydrogen and methane.

In an alternate embodiment of the method, the product gas is further processed to recover hydrogen in substantially pure form. To recover substantially pure hydrogen, the product gas can be flowed under a vacuum through a Pd/Ag membrane coated on a porous metal or ceramic plate.

BRIEF DESCRIPTION OF THE DRAWINGS

Exemplary embodiments are illustrated in the referenced figures of the drawings. It is intended that the embodiments and the figures disclosed herein are to be considered illustrative rather than limiting.

DETAILED DESCRIPTION OF THE PREFERRED EMBODIMENTS

The following definitions are used in the present disclosure. HYTHANE means a hydrogen enriched alternative fuel comprised of hydrogen and methane and impurities included in hydrogen and natural gas.

Methane slip means unreacted methane which passes through a system without reacting.

Microwave irradiation means electromagnetic irradiation in the range of 0.3 to 300 GHz.

Method

Figure 1:
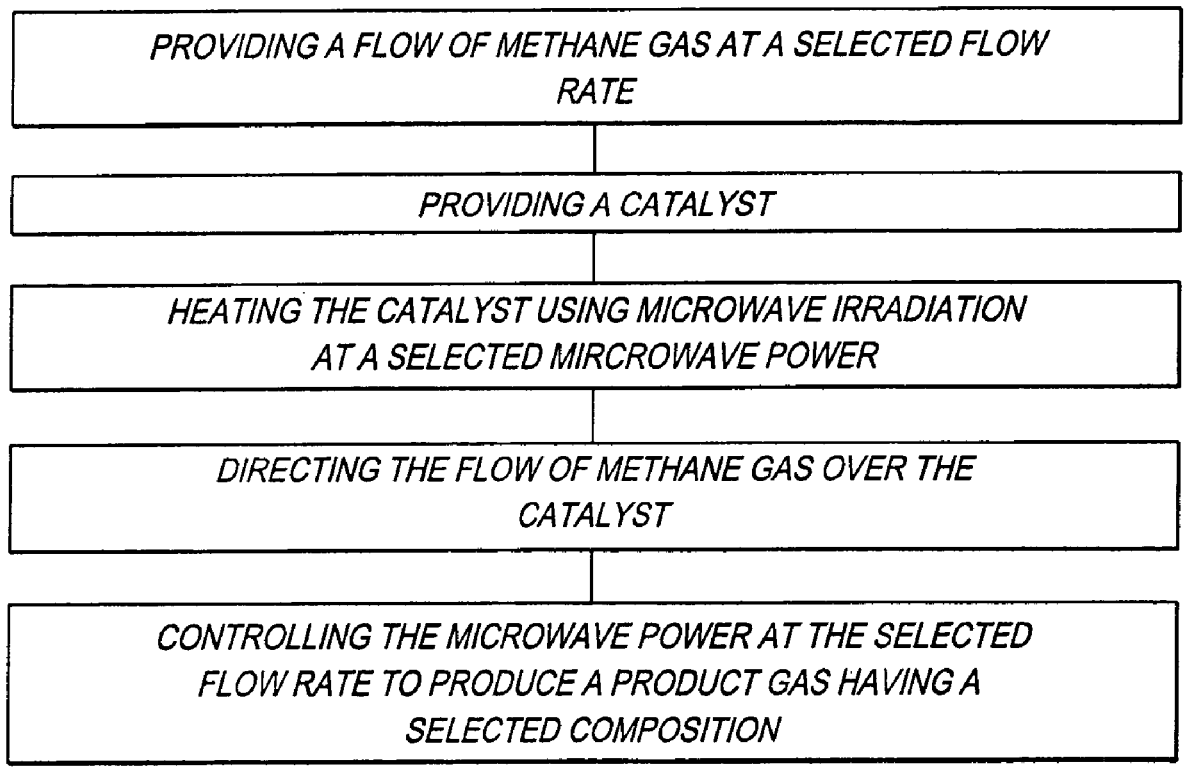
FIG. 1 is a flow diagram illustrating steps in a method for producing a hydrogen enriched fuel.

Referring to FIG. 1, steps in a method for producing a hydrogen enriched fuel are illustrated. The first step comprises "providing a flow of methane gas at a selected flow rate". By way of example, the methane gas can be in the form of pure methane gas. Alternately, the methane gas can be in the form of natural gas obtained from a "fossil fuel" deposit. Natural gas is typically about 90+% methane, along with small amounts of ethane, propane, higher hydrocarbons, and "inerts" like carbon dioxide or nitrogen. In addition, the methane gas can be supplied from a tank (or a pipeline) at a selected temperature and pressure. Preferably, the methane gas is provided at about room temperature (20 to 25° C.), and at about atmospheric pressure (1 atmosphere). Further, the methane gas can be provided at the selected flow rate. In the examples to follow, the selected flow rate of the methane gas is about 120 ml/minute (STP).

As also shown in FIG. 1, the method includes the step of "providing a catalyst". Preferably, the catalyst is provided in the form of particles having a diameter of from 74 μm to 140 μm. In addition, the catalyst is preferably contained on a holder, which allows the methane gas to flow freely along the surfaces of the catalyst particles. In addition, catalysts in the form of metal oxides can be pre-treated using $H_2$ to reduce the metal oxide to a metal.

A preferred metal for the catalyst comprises Ni, or an alloy containing Ni. For example, the metal can comprise NiAl, or Ni doped with Cu, Pd, Fe, Co, or an oxide such as MgO, ZnO, $Mo_2O_3$ or $SiO_2$. Specific catalysts include Ni81Al, Ni93Al, Ni77Cu16Al, Ni54Cu27Al and Ni83Mg6Al. In addition, nickel based catalyst precursors can be prepared by coprecipitation from a mixed aqueous solution of nitrates with sodium carbonate.

The following Table I provides information on catalyst preparation of nickel-based precursors for the above catalysts. These catalysts were prepared by coprecipitation from a mixed aqueous solution of nitrates with sodium carbonate.

TABLE 1

| | | Catalyst Preparation Catalyst Composition |
|---|---|---|
| 1 | Ni81Al | 81 wt. % NiO-19 wt. % $Al_2O_3$ |
| 2 | Ni93Al | 93 wt. % NiO-7 wt. % $Al_2O_3$ |
| 3 | Ni77Cu16Al | 77 wt. % NiO-16 wt. % CuO-7 wt. % $Al_2O_3$ |
| 4 | Ni54Cu27Al | 54 wt. % NiO-27 wt. % CuO-9 wt. % $Al_2O_3$ |
| 5 | Ni83Mg6Al | 83 wt. % NiO-6 Wt. % MgO-11 wt. % $Al_2O_3$ |

However, rather than Ni or an alloy thereof, the catalyst can comprise another metal, such as a metal selected from group VIII of the periodic table including Fe, Co, Ru, Pd and Pt. In any case the catalyst is selected and formulated to remain stable under reaction conditions for long periods of time. In the examples to follow there was no indication that the catalyst was going to be deactivated, even after over 16 hours of reaction time.

As also shown in FIG. 1, the method includes the step of "heating the catalyst using microwave irradiation at a selected microwave power". This step can be performed using a conventional microwave generator and microwave circulator configured to irradiate the catalyst with microwave irradiation. In general, the catalyst will absorb microwave energy through relaxation mechanisms (e.g., dipolar, ion jump, ohmic losses), which selectively heat the metal catalyst instead of the reactor wall and the methane gas, thus significantly saving the energy consumption of the catalyst/microwave heating process.

Heating the catalyst by microwave irradiation provides the following advantages:

a.) volumetric heating, fast, b.) selectively heating the catalyst instead of the reactor wall and the methane gas, high efficiency, c.) low temperature gradient, d.) hot spot to prevent serial reaction of product, e.) may also influence catalytic reaction by changing the electronic properties of the catalyst in the microwave electromagnetic field.

In the examples to follow, the microwave generator was operated at a power of about 250 watts, and the catalyst was heated to a temperature of from about 600 to 700° C. However, it is to be understood that the method can be practiced at a microwave power that is selected to achieve a desired product gas composition. For example, a representative range for the microwave power can be from 150 watts to 300 watts. Also in the examples to follow, the microwave generator was operated at a frequency of 2.45 GHz. For performing microwave irradiation, the reactor and the holder for the catalyst must be made of a microwave transparent material able to withstand high temperatures. One suitable material for the reactor and the holder comprises quartz.

As also shown in FIG. 1, the method includes the step of "directing the flow of methane gas over the catalyst". This step can be performed by placing the catalyst in a microwave transparent reactor having a reaction chamber configured to contain the catalyst, and to direct the flow of methane gas over the catalyst.

As also shown in FIG. 1, the method includes the step of "controlling the microwave power at the selected flow rate to produce a product gas having a selected composition". This step can be performed using a microwave generator having variable power controls.

System

Figure 2:
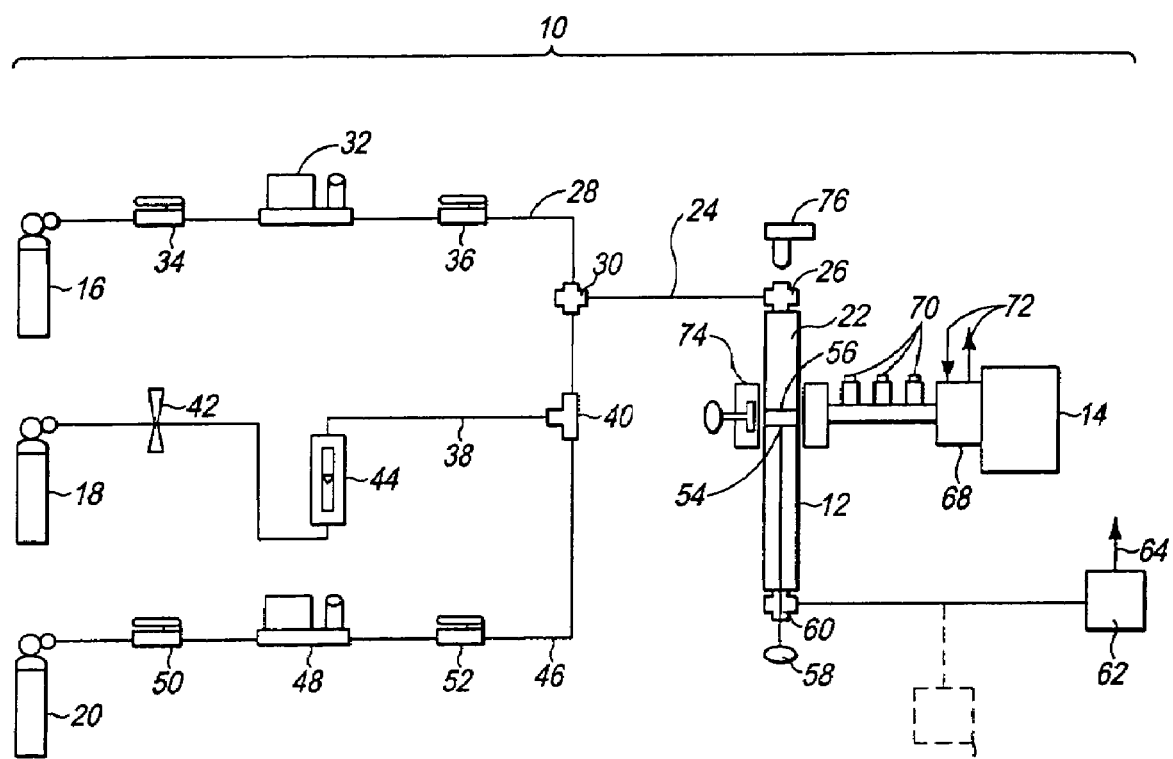
FIG. 2 is a schematic drawing of a system for producing a hydrogen enriched fuel.

Referring to FIG. 2, a system 10 for producing a hydrogen enriched fuel, in accordance with the previously described method, is illustrated. The system 10 includes a reactor 12, and a microwave generator 14. The system also includes a methane supply 16, a hydrogen supply 18, and an inert gas supply 20 in flow communication with the reactor 12.

The reactor 12 (FIG. 2) can comprise a conventional tube reactor made of a microwave transparent material, such as quartz. In addition, the reactor 12 includes a sealed process chamber 22 having an inlet 26 in flow communication with a supply conduit 24.

The supply conduit 24 (FIG. 2) is in flow communication with a methane conduit 28 via a union 30, which is in flow communication with the methane supply 16. In addition, the methane conduit 28 includes a methane mass flow controller 32 configured to remotely control the flow of methane gas into the reaction chamber 22, and shut off valves 34, 36 on either side of the methane mass flow controller 32. In the illustrative embodiment, the methane supply 16 is configured to provide pure methane. However, it is to be understood that the system 10 can include, and the method can be practiced, using another methane source, such as natural gas.

The supply conduit 24 (FIG. 2) is also in flow communication with a hydrogen conduit 38 via a union 40, which is in flow communication with the hydrogen gas supply 18. The hydrogen conduit 38 includes a needle valve 42 configured to manually regulate the flow of hydrogen gas into the reaction chamber 22, and a rotameter 44 configured to measure the hydrogen flow.

The supply conduit 24 (FIG. 2) is also in flow communication with an inert gas conduit 46, which is in flow communication with the inert gas supply 20. The inert gas can comprise Ar or another inert gas, such as He or Ne. The inert gas conduit 46 also includes an inert gas mass flow controller 48 configured to remotely control the flow of inert gas into the reaction chamber 22, and shut off valves 50, 52 on either side of the inert gas mass flow controller 48. The inert gas conduit 46 can be used to purge the reaction chamber 22.

In addition to the reaction chamber 22 (FIG. 2), the reactor 12 includes a holder 54 configured to hold a catalyst 56 in the reaction chamber 22. As with the reactor 12 and the walls of the reaction chamber 22, the holder 54 is made of a microwave transparent material. In addition, the holder 54 has a cup like configuration with openings that permit gas flow through the holder 54 and around the catalyst 56. The holder 54 also includes a handle 58 configured to permit removal of the holder 54 and the catalyst 56 from the reaction chamber 22.

The reactor 12 (FIG. 2) also includes an outlet 60 in flow communication with the reaction chamber 22. The outlet 60 of the reactor 12 is configured to exhaust the product gas formed in the reaction chamber 22. The outlet 60 is in flow communication with a gas chromatograph 62 configured to analyze the chemical composition of the product gas exiting the reaction chamber 22. In addition, the gas chromatograph 62 is in flow communication with a vent 64 configured to vent product gases, which have been analyzed to the atmosphere. The outlet 60 of the reactor 12 can also be in flow communication with a product gas storage vessel 66 configured to store the product gas for future use.

The microwave generator 14 (FIG. 2) of the system 10 is configured to direct microwave radiation through a microwave circulator 68, and through a three stub tuner 70, to the catalyst 56 held on the holder 54 in the reaction chamber 22. The microwave circulator 68 also includes a cooling system 72. In addition, a microwave adjust plug 74 is configured to remotely adjust the reflected power of the microwave generator 14.

The system 10 (FIG. 2) also includes an infrared temperature sensor 76 configured to measure the temperature of the catalyst 56.

EXAMPLE 1

Using the previously described method (FIG. 1), and the previously described system 10 (FIG. 2), a hydrogen enriched fuel comprising $CH_4$ and $H_2$ was produced under the following conditions.

A. Pure methane gas (99.7% purity) was supplied through the methane supply conduit 28 to the reactor 12 (FIG. 12).

B. Methane flow rate (i.e., selected flow rate in FIG. 1): 120 ml/minute.

C. Catalyst 56 (FIG. 2): Ni54Cu27Al.

D. The catalyst 56 (FIG. 2) was initially reduced for a period of several minutes in $H_2$ plasma at a microwave power of 160 W. For reducing the catalyst 56 (FIG. 2), a flow of $H_2$ gas was supplied through the hydrogen supply conduit 38 (FIG. 2) to the reaction chamber 22 (FIG. 2), and irradiated with microwave energy from the microwave generator 14 (FIG. 2) to form a plasma.

E. Reaction pressure: atmospheric pressure (1 atm).

F. Products (hydrogen enriched fuel): $H_2$, solid carbon C and unreacted $CH_4$, by the reaction $CH_4 = C + 2H_2$. SEM (scanning electron microscopy) pictures of the solid carbon demonstrate that the carbon is in the form of fibrous carbon rather than carbon black. In addition, the fibrous carbon is a useful by-product that can be used for other applications.

G. Microwave power applied to the catalyst: 250 W.

H. Methane conversion: approximately 20%.

I: Unreacted methane: approximately 80%.

J. Production rate: about 48 Ml/minute of $H_2$ at stable conditions.

K. In Example 1 the only energy consumed was in heating the catalyst. Accordingly the process is energy efficient.

Figure 3:
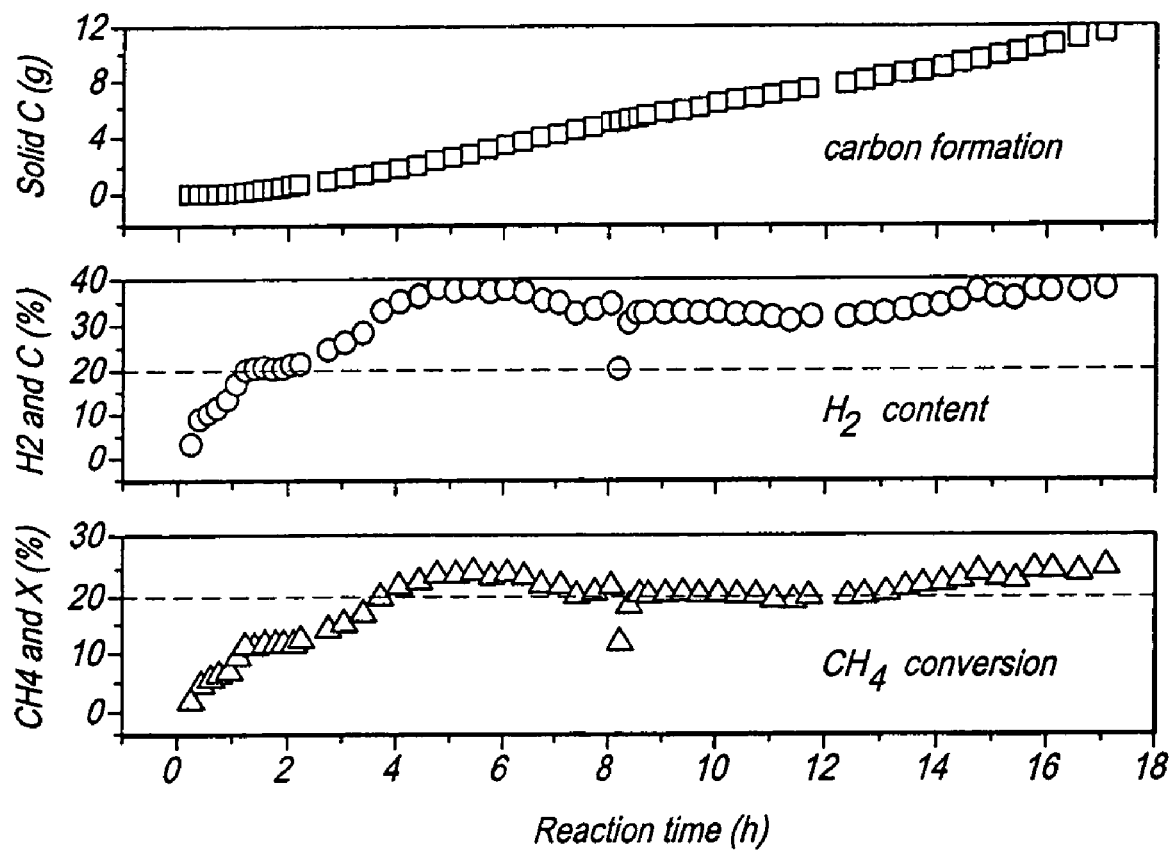
FIG. 3 are overlaid graphs illustrating $CH_4$ conversion, $H_2$ content, and carbon formation versus reaction time for Example 1 using a Ni54Cu27Al catalyst.

FIG. 3 illustrates the results of $CH_4$ conversion assisted by microwave heating using Ni54Cu27Al as the catalyst 56

(FIG. 2). Example 1 was a continuous process. In FIG. 3, the reaction time in hours (h) denotes the length of time that the process was performed.

In FIG. 3 there are three separate graphs. The lower graph plots the conversion rate "X %" of the $CH_4$ on the y-axis (expressed as a volume percentage) versus the reaction time in hours on the x-axis. The middle graph plots the content "C %" of $H_2$ on the y-axis (expressed as a volume percentage) versus the reaction time in hours on the x-axis. The upper graph plots the amount of solid carbon (Solid C (g)) on the y-axis (expressed in grams) versus the reaction time in hours on the x-axis.

EXAMPLE 2

Example 2 was performed using the same conditions as outlined above for Example 1 but with the catalyst comprising Ni81Al rather than Ni54Cu27Al.

Figure 4:
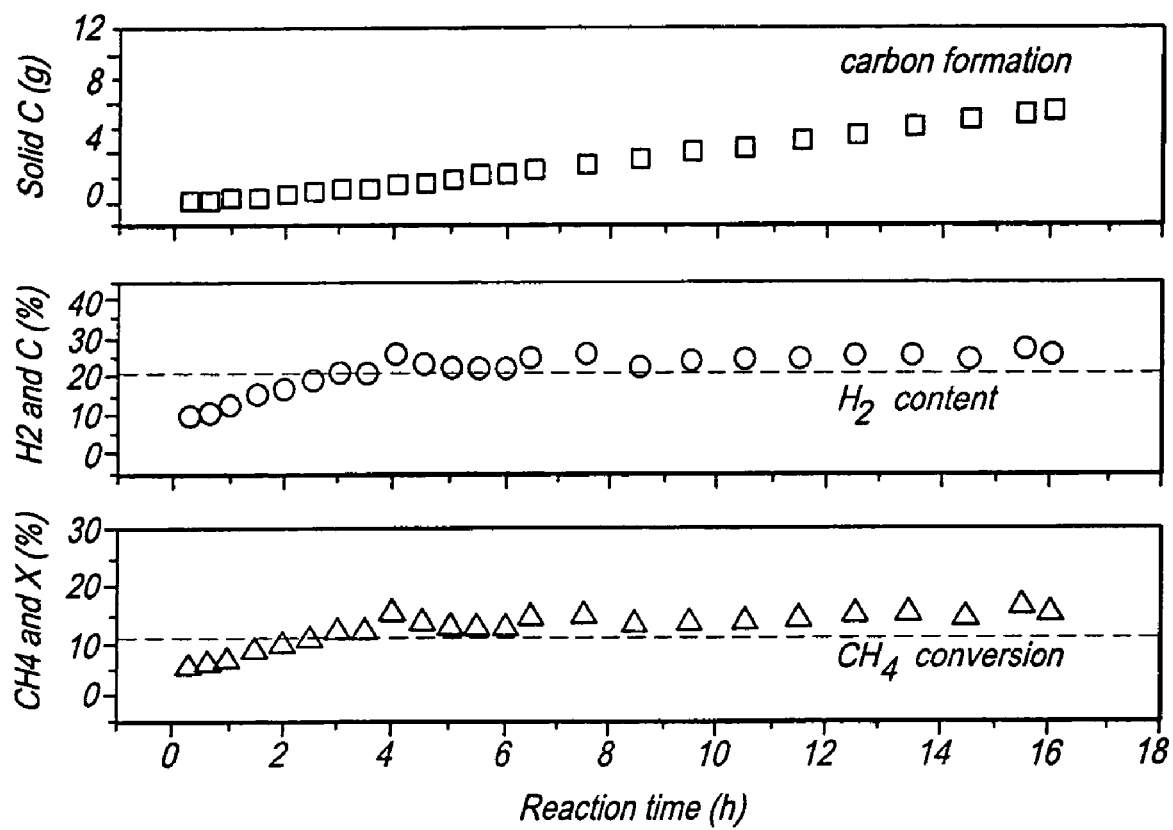
FIG. 4 are overlaid graphs illustrating $CH_4$ conversion, $H_2$ content, and carbon formation versus reaction time for Example 2 using a Ni81Al catalyst.

FIG. 4 illustrates the results of $CH_4$ conversion assisted by microwave heating using Ni81Al as the catalyst 56 (FIG. 2). Example 2 was a continuous process. In FIG. 4, the reaction time in hours (h) denotes the length of time that the process was performed.

In FIG. 4 there are three separate graphs. The lower graph plots the conversion rate "X %" of the $CH_4$ on the y-axis (expressed as a volume percentage) versus the reaction time in hours on the x-axis. The middle graph plots the content "C %" of $H_2$ on the y-axis (expressed as a volume percentage) versus the reaction time in hours on the x-axis. The upper graph plots the amount of solid carbon (Solid C (g)) on the y-axis (expressed in grams) versus the reaction time in hours on the x-axis.

From these two examples it was determined that a product gas containing 30% by volume of $H_2$ can be produced continuously and stably by microwave heating a Ni54Cu27Al catalyst. A product gas containing 20% by volume of $H_2$ can be produced continuously and stably by microwave heating a Ni81Al catalyst.

Alternate Embodiment For Producing Pure Hydrogen

An alternate embodiment of the method includes the additional step of further processing the product gas to recover hydrogen in substantially pure form. One method for recovering pure hydrogen is to flow the product gas under a vacuum through a Pd/Ag membrane coated on a porous metal or ceramic substrate. U.S. Pat. No. 6,165,438, to Willms et al., which is incorporated herein by reference, discloses an apparatus and method for the recovery of hydrogen from a gas containing hydrocarbons.

Thus the disclosure describes an improved method and system for producing a hydrogen enriched fuel. While the description has been with reference to certain preferred embodiments, as will be apparent to those skilled in the art, certain changes and modifications can be made without departing from the scope of the following claims.

What is claimed is:

1. A method for producing a hydrogen enriched fuel comprising:
providing a flow of methane gas;
preparing a catalyst comprising NiO and $Al_2O_3$ by coprecipitation of a nickel based catalyst precursor from an aqueous solution;
heating the catalyst using microwave irradiation at a selected microwave power;
directing the flow of methane gas over the catalyst to convert at least some of the methane gas to fibrous carbon and hydrogen; and
controlling the flow of the methane gas and the microwave power to produce a solid carbon product comprised of the fibrous carbon and a product gas comprising about 20% to 30% hydrogen by volume and about 70% to 80% methane by volume.

2. The method of claim 1 wherein the catalyst comprises particles having a diameter of from 74 μm to 140 μm.

3. The method of claim 1 wherein the catalyst has a composition of Ni8Al, Ni93Al, Ni77Cu16Al, Ni54Cu27Al or Ni83Mg6Al.

4. The method of claim 1 wherein the flow of the methane gas is about 120 ml/minute and the microwave power is from about 150 watts to 300 watts.

5. The method of claim 1 further comprising pretreating the catalyst prior to the heating step by directing a flow of a hydrogen plasma over the catalyst for a selected time period.

6. The method of claim 1 wherein the aqueous solution comprises nitrates and sodium carbonate.

7. The method of claim 1 wherein the directing step is performed with the catalyst placed on a microwave transparent holder having a plurality of openings configured to allow the flow of methane gas to pass through the catalyst.

8. The method of claim 1 further comprising processing the product gas to recover substantially pure hydrogen.

9. A method for producing a hydrogen enriched fuel comprising:
providing a flow of methane gas at a selected flow rate;
preparing a catalyst by coprecipitation of a nickel based catalyst precursor such that the catalyst has a composition of Ni8Al, Ni93Al, Ni77Cu16Al, Ni54Cu27Al or Ni83M6Al where Ni comprises NiO, Al comprises $Al_2O_3$, Cu comprises CuO and Mg comprises MgO;
heating the catalyst using microwave irradiation at a selected microwave power;
directing the flow of methane gas over the catalyst to convert at least some of the methane gas to fibrous carbon and hydrogen; and
controlling the preparing step, controlling the flow of methane gas, and controlling the microwave power to produce a product gas comprising about 70% to 80% unreacted methane and about 20% to 30% hydrogen.

10. The method of claim 9 wherein the heating step is performed by placing the catalyst on a microwave transparent holder having a plurality of openings configured to allow the flow of methane gas around the particles.

11. The method of claim 10 wherein the catalyst has the composition Ni81Al.

12. The method of claim 11 wherein the catalyst comprises particles having a diameter of from 74 μm to 140 μm.

13. The method of claim 12 further comprising placing the catalyst on a holder having a plurality of openings configured to allow the flow of methane gas over the catalyst.

14. The method of claim 13 further comprising pretreating the catalyst by directing a hydrogen plasma over the catalyst for a selected time period.

15. The method of claim 14 wherein the pretreating step is performed at a microwave power of about 160 watts for at least one minute.

16. The method of claim 9 wherein the flow of the methane gas is about 120 ml/minute and the microwave power is from about 150 watts to 300 watts.

17. A method for producing a hydrogen enriched fuel comprising:
- providing a tube reactor having a reaction chamber with microwave transparent walls in flow communication with a methane source;
- preparing a catalyst by coprecipitation of a nickel based catalyst precursor such that the catalyst has a composition of Ni81Al, Ni93Al, Ni77Cu16Al, Ni54Cu27Al or Ni83Mg6Al where Ni comprises NiO, Al comprises $Al_2O_3$, Cu comprises CuO and Mg comprises MgO;
- placing the catalyst in the reaction chamber on a microwave transparent holder;
- providing a microwave generator;
- pretreating the catalyst by directing a hydrogen plasma over the catalyst for a selected time period;
- irradiating the catalyst using microwave irradiation at a selected microwave power of the microwave generator;
- directing a flow of methane gas through the reaction chamber into contact with the catalyst to convert at least some of the methane gas to hydrogen gas and solid carbon; and
- controlling the preparing step, controlling the irradiating step, and controlling the directing step to produce a product gas comprising about 70% to 80% unreacted methane and about 20% to 30% of the hydrogen gas.

18. The method of claim 17 wherein the flow of the methane gas is about 120 ml/minute, the microwave power is from about 150 watts to 330 watts and the catalyst is heated to a temperature between about 600° C. to 700° C.

19. The method of claim 17 wherein the catalyst comprises particles having a diameter of from 74 μm to 140 μm.

20. The method of claim 17 wherein the placing step comprises placing the catalyst on a holder having a plurality of openings configured to allow the flow of methane gas over the catalyst.

21. The method of claim 17 wherein the solid carbon comprises fibrous carbon.

22. The method of claim 17 further comprising processing the product gas to recover substantially pure hydrogen.

23. The method of claim 22 wherein the processing step comprises flowing the product gas under a vacuum pressure through a Pd/Ag membrane.

* * * * *